(12) United States Patent
Frank et al.

(10) Patent No.: US 6,636,555 B1
(45) Date of Patent: Oct. 21, 2003

(54) AMPLITUDE LIMITATION

(75) Inventors: Georg Frank, Nürnberg (DE); Michael Niegel, Lauf (DE); Udo Rödel, Erlach (DE)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 09/320,115

(22) Filed: May 26, 1999

(30) Foreign Application Priority Data

May 29, 1998 (DE) ......................................... 198 24 233

(51) Int. Cl.[7] ............................................. H04B 1/707
(52) U.S. Cl. ....................................... 375/146; 375/296
(58) Field of Search ................................. 375/146, 295, 375/296, 297, 298, 260, 261; 370/206, 320, 335, 342, 462, 480, 484, 527, 441, 479; 455/91, 102, 103, 108, 501, 63, 67.3, 93, 117

(56) References Cited

U.S. PATENT DOCUMENTS

| | | | |
|---|---|---|---|
| 4,462,001 A | | 7/1984 | Girard .......................... 330/149 |
| 5,381,449 A | | 1/1995 | Jasper et al. .................... 375/59 |
| 5,579,404 A | * | 11/1996 | Fielder et al. ............... 381/106 |
| 5,610,908 A | | 3/1997 | Shelswell et al. ............ 370/210 |
| 5,784,410 A | * | 7/1998 | Nakano ....................... 375/345 |
| 5,991,262 A | * | 11/1999 | Laird et al. .................. 370/209 |
| 6,009,090 A | * | 12/1999 | Oishi et al. .................. 370/342 |
| 6,144,694 A | * | 11/2000 | Uta et al. .................... 375/146 |
| 6,266,320 B1 | * | 7/2001 | Hedberg et al. ............. 370/206 |

FOREIGN PATENT DOCUMENTS

| | | | |
|---|---|---|---|
| DE | 19625054 | 6/1996 | ............ H04J/13/02 |
| DE | 19635813 | 9/1996 | ............ H04J/11/00 |
| EP | 0 365 226 A2 | 4/1990 | ............ G06F/7/548 |
| EP | 0797323 | 9/1997 | ............ H04H/1/00 |
| WO | 9810567 | 3/1998 | ............ H04L/27/26 |
| WO | PCT/EP99/03115 | 8/1999 | |

OTHER PUBLICATIONS

J. E. Volder, "The CORDIC Trigonometric Compting Technique", IRE Transactions on Electronic Computers, Sep. 1959, pp. 330–334.

* cited by examiner

Primary Examiner—Chi Pham
Assistant Examiner—Khanh Cong Tran
(74) Attorney, Agent, or Firm—Jenkens & Gilchrist, P.C.

(57) ABSTRACT

Apparatus and method for reducing the range of a transmission signal comprising a plurality of digitally represented complex communication signals, including means for estimating the magnitude of each of the plurality of complex communication signals, based on the complex components, means for determining at least one scaling factor based on the plurality of determined amplitudes and means for reducing the amplitude of the respective complex signal components. The system is accommodated to operate at very high frequency and may advantageously be provided with a circuit determining the amplitude of each of the complex signals using the CORDIC algorithm. The system may further be provided with means for scaling the magnitude of each of the complex components in a coarse scaling step and a fine scaling step. The system allows to effectively reduce the amplitude of the transmission signal eliminating the need for larger and more expensive amplifiers.

28 Claims, 7 Drawing Sheets

AMPLITUDE LIMITATION

FIELD OF INVENTION

The present invention relates to limiting the amplitude of a transmission signal, e.g., a telecommunication signal to be transmitted via a radio station.

BACKGROUND OF THE INVENTION

In telecommunications systems, usually a large number of communication channels is transmitted together via the same transmission medium, e.g., a radio frequency band. Various access schemes for placing communication channels on the transmission medium are known. A well-known scheme is CDMA (Code Division Multiple Access) where a number of different communication channels is transmitted simultaneously in a radio frequency band in such a way that they overlap in both the time domain and the frequency domain.

In order to distinguish each communication channel signal from the other communication channel signals, each communication channel signal is encoded with one or more unique spreading codes, as is well-known in the art. By modulating each of the communication channel signals with a spreading code, the sampling rate (i.e., the "chip rate") may be substantially increased in accordance with a spreading factor. For example, each communication channel signal is modulated in accordance with a digital modulation scheme, e.g., a quadrature amplitude modulation (QAM) or a phase shift keying (PSK) technique. Consequently, an in-phase and quadrature component signal is produced for each communication channel signal. QAM and PSK are well known in the art. The in-phase and quadrature component signals associated with each of the communication channels are then encoded using a unique spreading code sequence. The resulting in-phase and quadrature component signal pairs are sampled (i.e., at the chip rate) and individually weighted. The in-phase and quadrature component signals are eventually combined to form a composite in-phase signal and a composite quadrature signal. The composite in-phase signal and the composite quadrature signal are then separately filtered by a low-pass, pulse shaping filter. Subsequent to filtering, the composite in-phase signal and the composite quadrature signal are modulated by a cosine-carrier and a sine-carrier respectively and combined into a single, multi-code transmission signal, e.g., a CDMA signal. The single, multicode transmission signal is then upconverted by a carrier frequency and the signal power associated with the transmission signal is boosted by a high power amplifier prior to transmission. At the receiving unit, the baseband signal associated with each of the communication channel signals is extracted from the transmission signal by demodulating and decoding the transmission signal using the carrier frequency and the various spreading codes. Furthermore, it will be understood that in a typical cellular telecommunications system, the transmission source may, for example, be a high power base station, and the receiving entity may, for example, be a mobile station (i.e., a mobile telephone).

When there is an especially large number of communication channel signals, it is sometimes preferable to generate two or more transmission or carrier signals, wherein each of the two or more carrier signals is modulated with its own unique carrier frequency. The two or more modulated carrier signals are then independently amplified by a corresponding high power amplifier prior to transmission, or alternatively, the two or more modulated carrier signals are combined into a single, complex transmission signal, which is then amplified by a single, high power amplifier prior to transmission.

As one skilled in the art will readily appreciate, CDMA substantially increases system bandwidth, which in turn, increases the network's traffic handling capacity a whole. In addition, combining independent carrier signals into a single complex transmission signal, as described above, is advantageous in that a single high power amplifier is required rather than a separate high power amplifier for each independent carrier signal. This is advantageous because high power amplifiers are expensive, and employing one high power amplifier in place of many will result in a substantial cost savings.

Despite the advantages associated with CDMA, combining multiple communication channel signals and/or independent carrier signals, in general, significantly increases the peak-to-average power ratio associated with the resulting transmission signal. More specifically, the peak-to-average power ratio for a transmission signal can be determined in accordance with the following relationship:

$$PR_{PTA} = PR_F + 10 \cdot \log(N)$$

wherein $PR_{PTA}$ represents the peak-to-average power ratio of the corresponding composite signal, $PR_F$ represents the power ratio of the low pass, pulse shaping filter and N represents the number of communication channels which make up the carrier (CDMA) signal.

The problem associated with large peak-to-average power ratio is that it diminishes the efficiency of the high power amplifier in the transmitter. Efficiency as one skilled in the art will readily understand, is measured in terms of the amount of output power (i.e., Pmean) divided by the amount of input power (i.e., Pdc+Ppeak). As Ppeak (i.e., peak power) increases relative to Pmean, the efficiency of the high power amplifier decreases.

One possible solution is to simply limit or clip the amplitude (i.e, Ppeak) of the carrier signal. Unfortunately, this is likely to result in the generation of intermodulation products and/or spectral distortions. Intermodulation products and/or spectral distortions are, in turn, likely to cause interference between the various communication channel signals. Accordingly, this is not a preferred solution.

Another possible solution is to design a more complex high power amplifier, one that can tolerate and more efficiently amplify (CDMA) carrier signals that exhibit large peak-to-average ratios. However, this too is not a preferred solution as the cost of high power amplifiers are generally proportional to complexity. Accordingly, this solution would result in driving up the cost of the telecommunications device that houses the high power amplifier.

U.S Pat. No. 5,621,762 ("Miller et al.") offers yet another possible solution for the peak-to-average power ratio problem, that is to limit the peak-to-average power ratio before the soon-to-be transmitted telecommunications signal is filtered and subsequently amplified. More specifically, Miller describes a peak power suppression device for reducing the peak-to-average power ratio of a single code sequence at the input of the high power amplifier. The peak power suppression device employs a digital signal processor (DSP) which receives the single code sequence, maps the code sequence onto a symbol constellation diagram, predicts an expected response from the pulse shaping filter and limits the amplitudes appearing on the symbol constellation diagram in accordance with the expected response of the pulse shaping filter.

The primary problem with the solution offered in Miller is that the peak power suppression device is incapable of coping with the high data bit rates encountered in telecommunications systems such as CDMA. Further, the device is incapable of coping with multiple carrier channel signals and/or multi-code sequences. For example, the peak power suppression device described in Miller is inherently slow, as evidenced by the fact that it employs a DSP (Digital Signal Processor), and by the fact that the DSP has the time necessary to execute a pulse shaping filter prediction algorithm. Therefore, a need exists for a telecommunications signal amplitude limitation device that is capable of limiting the peak-to-average power ratio of a telecommunications signal before it is filtered and subsequently amplified, and additionally, is capable of handling significantly higher bit rates, multiple code sequences, and multiple CDMA carrier signals.

SUMMARY OF THE INVENTION

It is therefore object of the invention to provide a method and apparatus for limiting the amplitude of a complex transmission signal comprising a plurality of carrier signal having high data rates.

This object of the invention is solved by an apparatus limiting an amplitude of a transmission signal, comprising: estimation means for estimating the amplitudes of each of a plurality of complex digital carrier signals based on their complex signal components, each of the signals including digitally encoded information transmitted via at least one communication channel; determining means for calculating a maximum amplitude based on the plurality of estimated amplitudes and for determining at least one amplitude scaling factor based on the maximum amplitude; scaling means for scaling the complex components of each of the plurality of complex digital carrier signals based on the at least one amplitude scaling factor; and combining means for combining the amplitude limited complex carrier signals to form the transmission signal.

According to the invention, the amplitudes of each of a plurality of complex digital carrier signals is estimated based on their complex signal components. The computed amplitudes are then used to determine at least one scaling factor for scaling the complex components of each of the plurality of complex digital carrier signals prior to combining the complex amplitude limited carrier signals to form the transmission signal.

Limiting the amplitude of each of the plurality of carrier signals allows to efficiently reduce the maximum amplitude of the complex transmission signal, thus eliminating the need for multiple power amplifiers or a single large power amplifier. Further, this allows to combine an arbitrary number of carrier signals and to process complex digital carrier signals having very high frequencies, e.g., in CDMA telecommunications applications.

Advantageously, the amplitudes of the individual carrier signals may be iteratively estimated using the CORDIC algorithm. The amplitude of a signal may be estimated with a sufficient accuracy employing at least two iterations according to the CORDIC algorithm.

In order to further reduce the computation effort, the number of bits used for a representation of the complex signal components may be reduced and absolute values of the complex components of the carrier signals prior to estimating the amplitudes may be determined. Further, the number of bits used for a digital representation of the estimated amplitudes may advantageously be reduced, at still sufficient accuracy, in order to still further reduce computation requirements.

The at least one amplitude scaling factor may also be a function of a clipping amplitude of an amplifier and the clipping amplitude may be a function of a pulse shaping filter.

Further, the at least one scaling factor may be computed as the largest integer smaller than the logarithm dualis of the maximum amplitude divided by the clipping amplitude.

The object of the invention is further solved by an apparatus for limiting an amplitude of a transmission signal, comprising: estimation means for estimating the amplitudes of each of a plurality of complex digital carrier signals based on their complex signal components, each of the signals including digitally encoded information transmitted via at least one communication channel; determining means for calculating a maximum amplitude based on the plurality of estimated amplitudes, including a first look up table for determining a first amplitude scaling factor based on the maximum amplitude and a second look up table for determining a second scaling factor; scaling means for scaling, in a coarse clipping operation, the digitally represented complex components of each of the plurality of complex digital carrier signals by deleting a number of low significance bits of the digital representations of the components, the number being determined by the first amplitude scaling factor, and for scaling, in a fine clipping operation executed after the coarse clipping operation, by multiplying the digital representations of each of the complex components with the second amplitude scaling factor; and combining means for combining the amplitude limited complex carrier signals to form the transmission signal.

In order to allow a shift scaling of the complex components of the carrier signals, a first look-up table may be used for determining at least one shift factor based on the maximum amplitude. Further, in a course clipping operation the digitally represented complex components of each of the plurality of complex digital carrier signals may be scaled by deleting an number of low significance bits of the digital representations of the components, the number being determined by the at least one shift factor.

This deleting of low significance bits may efficiently be executed by shifting the digital representations of the complex components in a register by a number of register locations determined by the at least one shift factor.

To increase accuracy of the scaling operation, a second look-up table may be provided for determining a second scaling factor, to be used in a fine clipping operation executed after the coarse clipping operation for multiplying the digital representations of each of the complex components with the second scaling factor.

Further, the object of the invention is solved by a method for limiting an amplitude of a transmission signal, comprising the steps of: estimating the amplitudes of each of a plurality of complex digital carrier signals based on their complex signal components, each of the signals comprising digitally encoded information transmitted via at least one communication channel; calculating a maximum amplitude based on the plurality of estimated amplitudes; determining at least one amplitude scaling factor based on the maximum amplitude; scaling the complex components of each of the plurality of complex digital carrier signals based on the at least one amplitude scaling factor; and combining the amplitude limited complex carrier signals to form the transmission signal.

Still further, the object of the invention is solved by a method for limiting an amplitude of a transmission signal, comprising the steps of: estimating the amplitudes of each of a plurality of complex digital carrier signals based on their complex signal components, each of the signals comprising digitally encoded information transmitted via at least one communication channel; calculating a maximum amplitude based on the plurality of estimated amplitudes; determining a first amplitude scaling factor based on the maximum amplitude using a first look up table and determining a second amplitude scaling factor using a second look up table; scaling, in a coarse clipping operation, the digitally represented complex components of each of the plurality of complex digital carrier signals by deleting a number of low significance bits of the digital representations of the components, the number being determined by the first amplitude scaling factor, and scaling, in a fine clipping step executed after the coarse clipping step, by multiplying the digital representations of each of the complex components with the second amplitude scaling factor; and combining the amplitude limited complex carrier signals to form the transmission signal.

Further advantageous embodiments of the invention are disclosed in further dependent claims.

The invention may best be understood if the description is read together with the accompanying drawings, in which:

DETAILED DESCRIPTION OF EMBODIMENTS

In the following, preferred embodiments of the invention will be described with respect to the figures. In the figures, corresponding parts are identified with the same reference signs.

Figure 8:
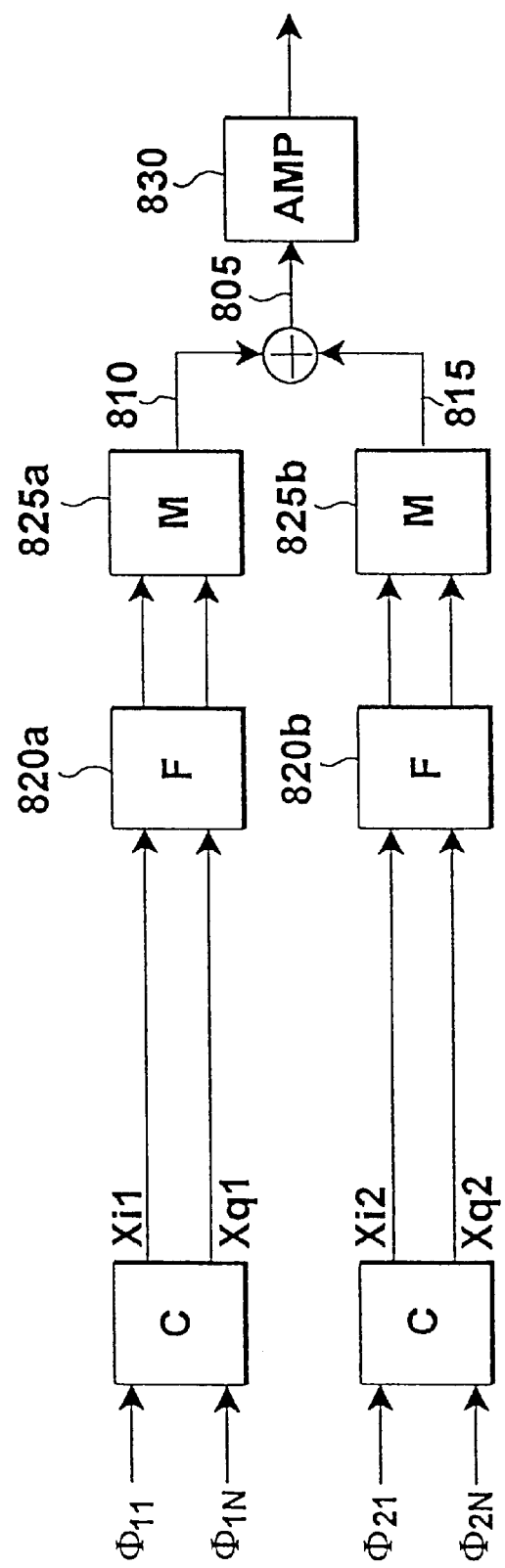
FIG. 8 illustrates a known method for generating a transmission signal.

FIG. 8 is a schematic diagram that depicts a prior technique for generating a complex transmission signal 805, e.g., in CDMA. As illustrated, the complex transmission signal 805 is generated by combining at least two independent carrier signals 810 and 815. In accordance with this prior technique, each communication channel signal from a first set of digital communication channel signals $\Phi_{11} \ldots \Phi_{1N}$ and each communication channel signal form a second set of digital communication channel signals $\Phi_{21} \ldots \Phi_{2N}$ is modulated using a quadrature amplitude modulation (QAM) technique. This results in the generation of an in-phase and a quadrature signal pair for each of the communication channel signals. Each of the in-phase signals associated with the first set of communication channel signals is then encoded using a unique spreading code, individually weighted and combined with other in-phase signals, thereby generating a first composite in-phase signal Xi1, and each of the quadrature signals associated with the first set of communication channel signals is likewise encoded, weighted and combined, thereby generating first composite quadrature signal Xq1. Similarly, each of the in-phase signals associated with the second set of communication channel signals is encoded, weighed and combined, thereby generating a second composite in-phase signal Xi2, and each of the quadrature signals associated with the second set of communication channel signals is encoded, weighted and combined, thereby generating a second composite quadrature signal Xq2.

As illustrated in FIG. 8, the composite in-phase signal Xi1 and the composite quadrature signals Xq1 are then forwarded to the first pulse shaping filter 820a. Similarly, the composite in-phase signal Xi2 and the composite quadrature signal Xq2 are forwarded to a second pulse shaping filter 820b.

Next, the filtered signals are forwarded to a first and a second vector modulator 825a and 825b. The vector modulator 825a modulates the composite in-phase signal Xi1 by a cosine-carrier with a frequency $f_1$ and it modulates the composite quadrature signal Xq1 by a sine-carrier also having the frequency $f_1$. The vector modulator 825a then combines the modulated, composite in-phase signal Xi1 with the modulated, composite quadrature signal Xq1, thereby generating the first independent carrier signal 810. Simultaneously, the vector modulator 825b modulates the composite in-phase signal Xi2 by a cosine-carrier with the frequency $f_2$ and it modulates the composite quadrature signal Xq2 by a sine-carrier also having a frequency $f_2$. The vector modulator 825b then combines the modulated, composite in-phase signal Xi2 with the modulated, composite quadrature signal Xq2, thereby generating the second independent carrier signal 815. The two independent carrier signals 810 and 815 are then combined to form the complex transmission signal 805, which is then forwarded to a high power amplifier 830 prior to transmission.

As explained above, the peak-to-average power ratio associated with the complex transmission signal 805 increases as the number of communication channel signals $\Phi$ increases, and increase in the peak-to-average power ratio, in turn, reduces the efficiency of the high power amplifier 830. In addition, if an attempt is made to limit or clip the amplitude of the complex transmission signal 805, e.g. a CDMA signal, in the high power amplifier 830 or in the transmitter (not shown) which houses the high power amplifier 830, a considerable amount of intermodulation and/or spectral distortion is likely to result.

Figure 1:
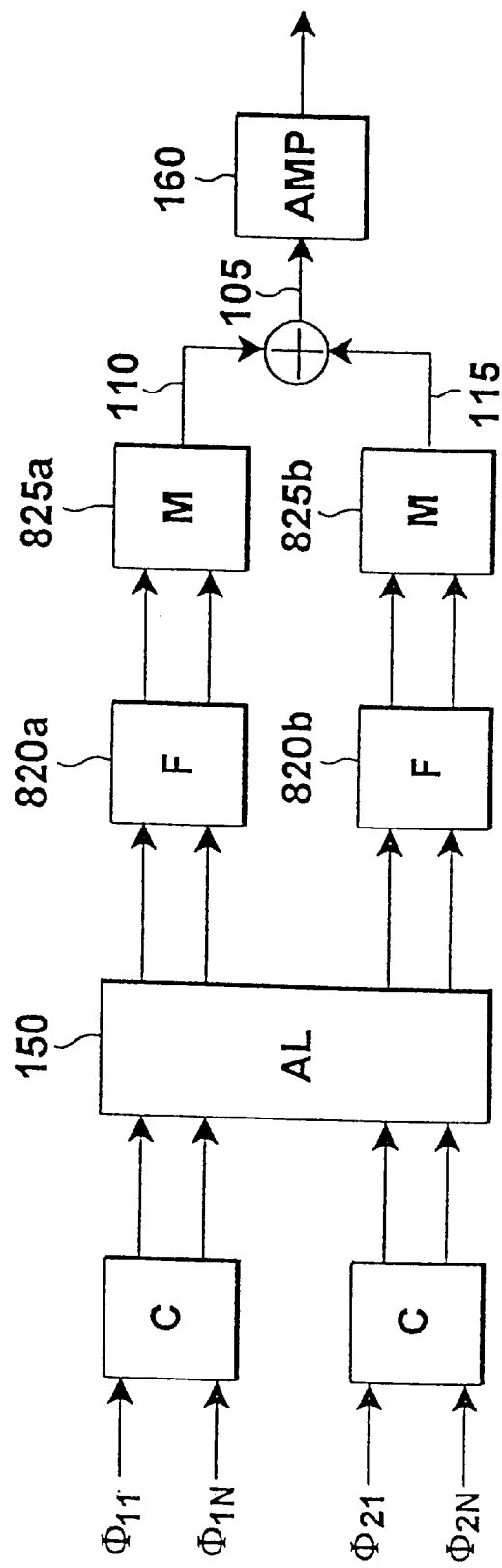
FIG. 1 illustrates a transmitter structure, e.g., CDMA, including a combiner, an amplitude limitation according to an embodiment of the invention, a pulse shaping filter and I-Q modulation.

In the following, a preferred embodiment of the invention is described with respect to FIG. 1. FIG. 1 depicts a technique for generating a transmission signal 105. This technique is similar to the technique depicted in FIG. 8, in that the preferred embodiment also involves encoding and combining each of a first and a second plurality of digital communication channel signals $\Phi_{11} \ldots \Phi_{1N}$ and $\Phi_{21} \ldots \Phi_{2N}$ into a first composite in-phase signal Xi1, a first composite quadrature signal Xq1, a second composite in-phase signal Xi2 and a second composite quadrature signal Xq2. However, unlike the prior technique depicted in FIG. 8, the composite in-phase and quadrature signals Xi1, Xq1, Xi2 and Xq2 are forwarded to an amplitude limitation device 150, e.g., and application specific integrated circuit (ASIC).

The amplitude limitation device 150 is a high speed hardware device that is capable of limiting the amplitude of the composite in-phase and quadrature signals Xi1, Xq1, Xi2 and Xq2 before the signals are forwarded to the pulse shaping filters 820a and 820b. The amplitude limitation device 150 will be described in greater detail below. The now filtered and amplitude adjusted in-phase and quadrature signals Xi1 and Xq1 are then modulated by a (CDMA) carrier with frequency $f_1$ and combined to form the first independent carrier signal 110. Similarly, the now filtered and amplitude adjusted in-phase and quadrature signals Xi2 and Xq2 are modulated by the carrier with frequency $f_2$ and combined to form the second independent carrier signal 115. The two independent carrier signals 110 and 115 are then combined to form the complex transmission signal 105. The signal power of the complex transmission signal 105 is then boosted by a high power amplifier 160 prior to transmission.

According to the present embodiment, both digital complex carrier signals may be combined before the final power amplifier is employed, because a highly linear high power amplifier needs a high implementation effort and is very expensive. If both carriers are combined before the final power amplifier, only one amplifier is need with a mean output power adapted to the sum of the power of both carriers. If combining is performed after the power amplifier, then two amplifiers were necessary, each with a 3 dB higher output power because of the loss in the combiner, combining the two digital carrier signals. That is, in both cases, the amplifiers have to provide the same output power, but only one amplifier is needed in the case of prior combining.

The above system and technique may preferably be applied in CDMA systems, however, this does not pose a limitation to the scope of the invention, the technique may equally well be applied to further telecommunications systems and in fact any system requiring a combining of a plurality of data channels into a single transmission channel.

Further, even though in the present embodiment two carrier signals are amplitude limited and combined to form a transmission signal, in further embodiments of the invention, an arbitrary number of carrier signals may be amplitude limited and combined to form a transmission signal.

In accordance with the preferred embodiment of the present invention, limiting the amplitude of a complex transmission signal, for example transmission signal 105, first requires the determination of a maximum amplitude r1, associated with the first independent carrier signal 110, and a maximum amplitude r2, associated with the second independent carrier signal 115. These determinations are better understood with reference to the symbol constellation diagram illustrated in FIG. 2, wherein $S_1$ represents the amplitude and phase corresponding with the first carrier signal 110 and $S_2$ represents the amplitude and phase corresponding with the second carrier signal 115. The maximum amplitudes r1 and r2 are then determined in accordance with the following relationships:

$$r1=|S_1|=(Xi1^2+Xq1^2)^{1/2} \quad (1)$$

$$r2=|S_2|=(Xi2^2+Xq2^2)^{1/2} \quad (2)$$

wherein Xi1, Xq1, Xi2 and Xq2 represent the instantaneous values of the composite in-phase and quadrature signals described above.

Once the maximum amplitudes r1 and r2 have been determined, r1 and r2 are used to calculate a scaling factor "S". In accordance with the preferred embodiment, the scaling factor "S" is determined by the following relationship:

$$S=A_{clip}/r \text{ (if } r > A_{clip})$$
$$S=1 \text{ (if } r \leq A_{clip}) \quad (3)$$

wherein $A_{clip}$ is defined as a maximum allowable amplitude value, e.g., realized at the input of the pulse shaping filters 820a and 820b, and "r" represents a maximum overall amplitude. More specifically, the maximum overall amplitude "r" may be given by the following relationship:

$$r=r1+r2 \quad (4)$$

The scaling factor "S" is then used to limit the instantaneous amplitudes associated with the composite in-phase and the composite quadrature signals Xi1, Xq1, Xi2 and Xq2.

Figure 3:
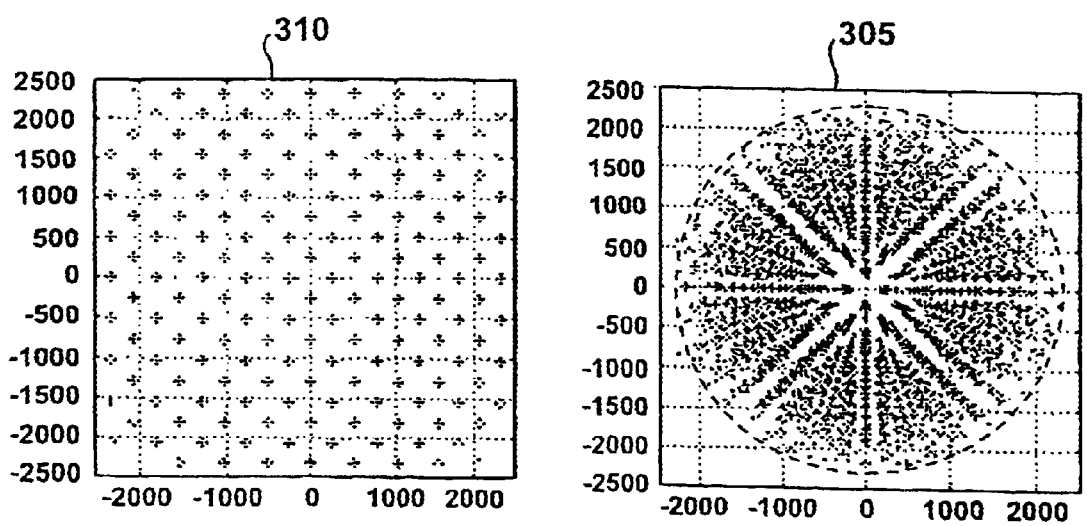
FIG. 3 illustrates two symbol constellation diagrams showing the amplitude distribution of a complex version of the transmission signal with and without amplitude limitation.

FIG. 3 illustrates two symbol constellations diagrams 305 and 310. The symbol constellation diagram 305 shows the location of the symbols (i.e., instantaneous amplitudes) associated with a complex transmission signal (e.g., complex transmission signal 105) when digital amplitude limitation, in accordance with the preferred embodiment of the present invention, is employed. The symbol constellation diagram 310 shows the location of the symbols associated with the complex transmission signal when digital amplitude limitation is not employed. As one skilled in the art will readily appreciate, the transmitted symbols are all located within a circular region whose radius is defined by $A_{clip}$, when digital amplitude limitation is employed. However, the transmitted symbols are not necessarily located within this circular region when digital amplitude limitation is not employed. The latter case is likely to result in larger peak-to-average power ratios and, as explained above, poor high power amplifier efficiency.

Figure 4:
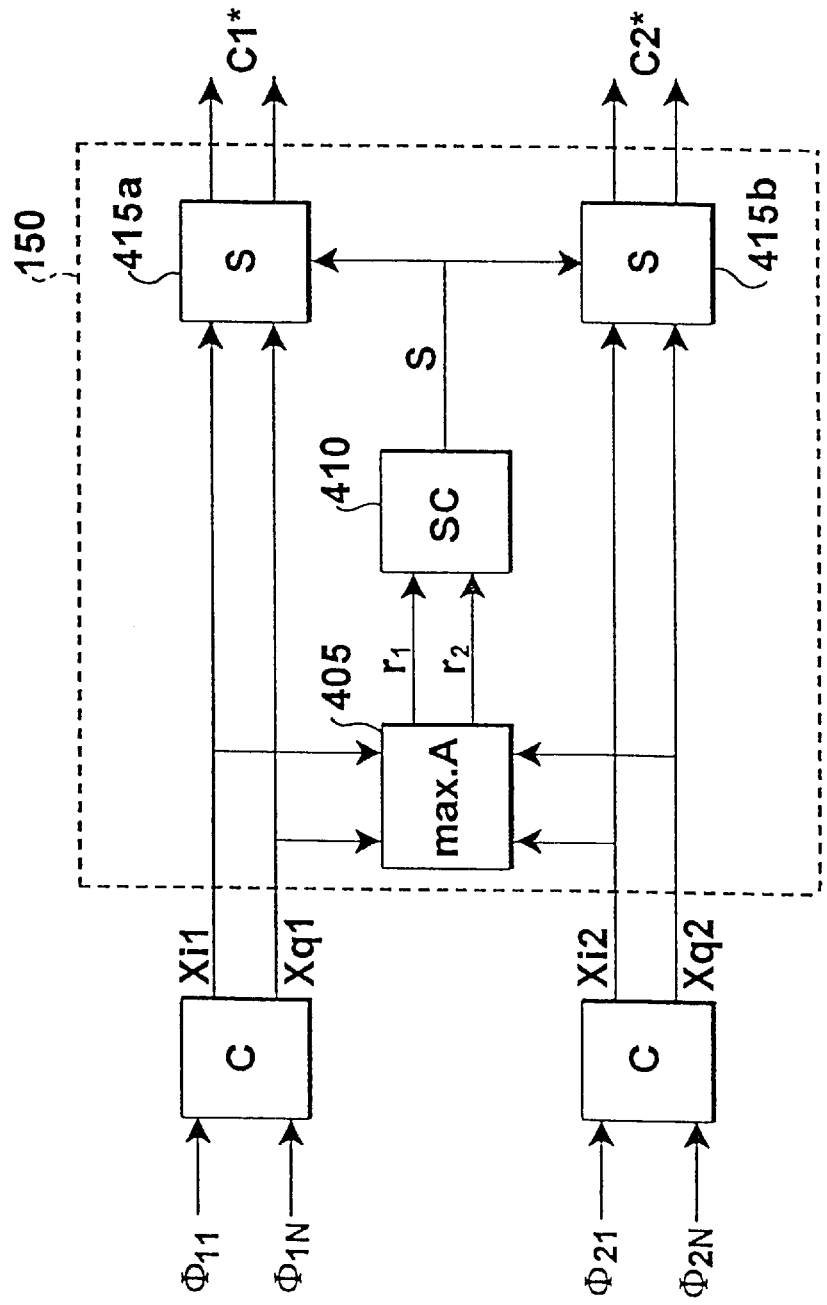
FIG. 4 shows a device for amplitude limitation of an embodiment of the invention.

FIG. 4 illustrates, in greater detail, the functional components associated with the amplitude limitation device 150 which are needed to execute the preferred amplitude limitation technique described before. More specifically, the amplitude limitation device 150 contains a maximum amplitude calculation module 405. The maximum amplitude calculation module 405 represents a high speed digital circuit that is capable of making the necessary measurements and computations to solve equations (1) and (2) above. The amplitude limitation device 150 then forwards r1 and r2 to a scaling factor computation module 410. The scaling factor computation module 410 represents a high speed digital circuit that is capable of performing the necessary computations to solve equations (3) and (4) above.

Once the scaling factor "S" is determined, the scaling factor calculation module 410 forwards the scaling factor "S" to scaling modules 415a and 415b. The scaling module 415a represents a high speed digital circuit that is capable of applying (e.g., multiplying) the scaling factor "S" to both the composite in-phase signal Xi1 and the composite quadrature signal Xq1. Similarly, the scaling module 415b represents a high speed digital circuit that is capable of applying the scaling factor "S" to both the composite in-phase signal Xi2 and the composite quadrature signal Xq2. Once the in-phase and quadrature signals Xi1, Xq1, Xi2 and Xq2 have been scaled, the amplitude limitation device 150 forwards the amplitude limited signals to the pulse shaping filters 820a and 820b, as illustrated in FIG. 1.

Figure 5:
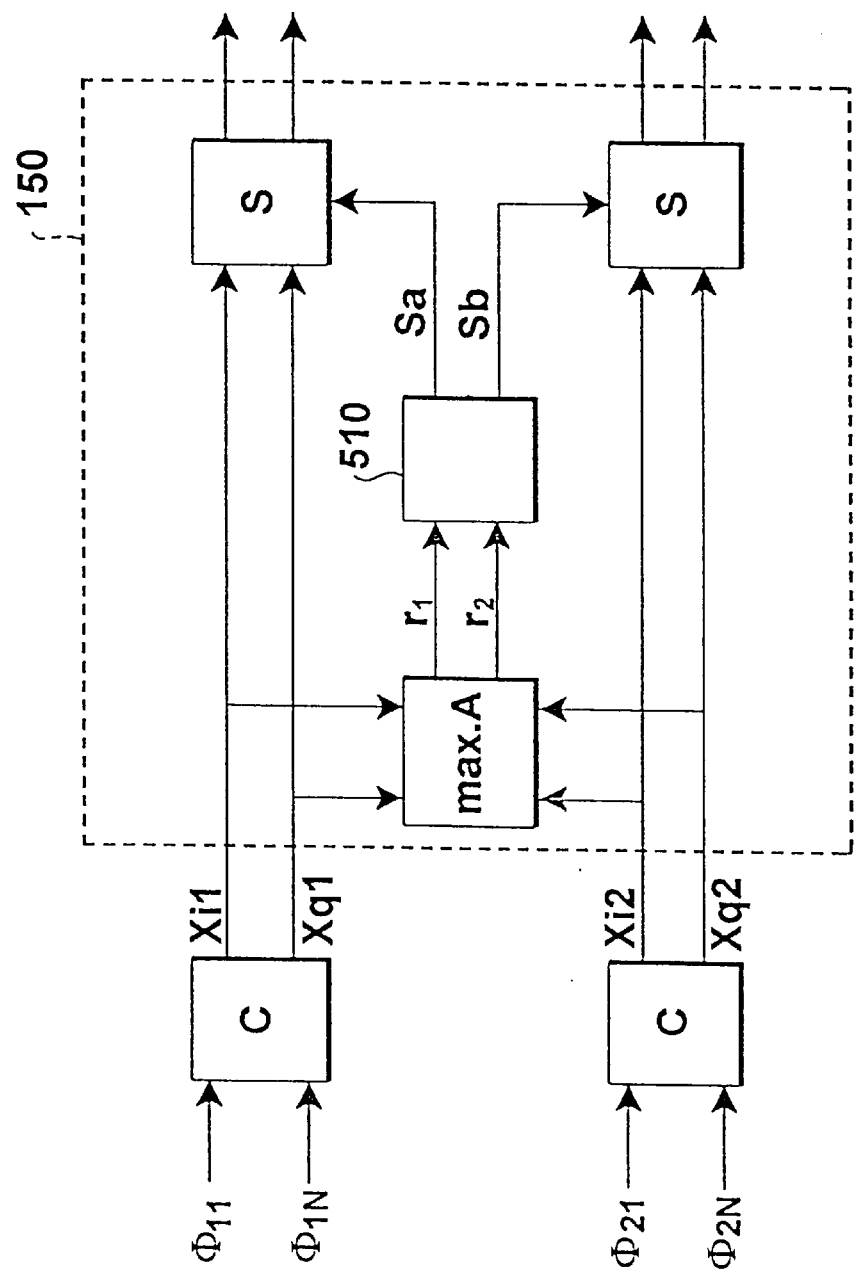
FIG. 5 shows still another embodiment of the device for amplitude limitation according to the invention.

FIG. 5 illustrates an alternative embodiment for the amplitude limitation device 150. In accordance with this alternative embodiment, separate scaling factors Sa and Sb are computed by the scaling factor computation module 510, wherein scaling factor Sa is utilized for independently adjusting the instantaneous amplitude of the in-phase and quadrature signals Xi1 and Xq1, and the scaling factor Sb is utilized for independently adjusting the instantaneous amplitude of the in-phase and quadrature signals Xi2 and Xq2. More specifically, Sa and Sb are determined in accordance with the following equations:

$$Sa=(A_{clip}/r1)*wa \quad (5)$$

$$Sb=(a_{clip}/r2)*wb \quad (6)$$

wherein wa and wb represent a first and second weighting factor for independently adjusting the scaling factors Sa and Sb, respectively.

Figure 2:
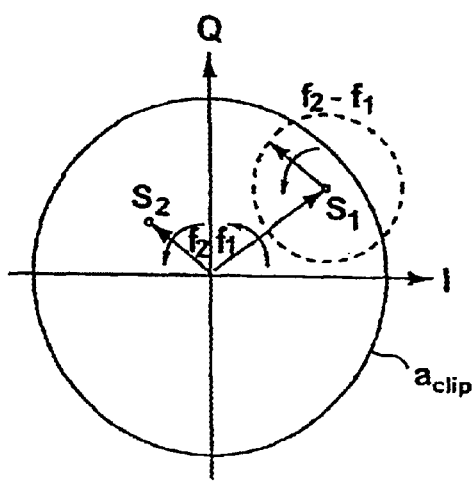
FIG. 2 shows in a schematic diagram illustrating the determination of a maximum amplitude from two complex carrier signals with different carrier frequencies.

The alternative technique illustrated in FIG. 5 may be employed when there is a significant disparity between the signal power levels associated with the communication channel signals of one of the carriers in FIG. 2 as compared to the signal power levels associated with the communication channel signals of the other carrier. If, e.g., the communication channel signals of one of the carriers are significantly lower than those associated with the communication channel signals of the other carrier, it may be appropriate to scale only the instantaneous amplitudes for the composite in-phase and quadrature signals Xi2 and Xq2. This can effectively be accomplished by setting the weighting factor wb to the value "1", and by setting the weighting factor wa such that Sa approximates the value "1". Of course, it will be understood that weighting factors wa and wb could be set to any value that is deemed appropriate to scale the instantaneous amplitudes for the composite in-phase and quadrature signals Xi1, Xq1, Xi2 and Xq2.

In accordance with yet another alternative embodiment, the instantaneous samples associated with the composite in-phase and quadrature signals (e.g., Xi1, Xq1, Xi2,Xq2) may be limited or clipped if the amplitude sample exceeds a predetermined maximum value. In order to prevent a corresponding decrease in the average power level of the composite transmission signal, and hence, an undesirable increase in the $PR_{PTA}$ of the composite transmission signal, this alternative generates a scaling factor which is then used to increase the amplitude of one or more subsequent, composite in-phase and quadrature signal samples, wherein the increase in amplitude over the one or more subsequent samples is proportional to the decrease in amplitude over the one sample that was previously clipped. Of Course, adjusting the amplitude of these subsequent samples compensates for the instantaneous amplitude sample, that was previously clipped. Moreover, one skilled in the art will appreciate that lower bit error rates can be achieved by modestly increasing the amplitude of several, subsequent, composite in-phase and quadrature signal samples rather than dramatically increasing the amplitude of a single, subsequent sample. This is especially true if increasing the amplitude of the single, subsequent sample results in that amplitude exceeding the aforementioned predetermined maximum value.

Figure 6:
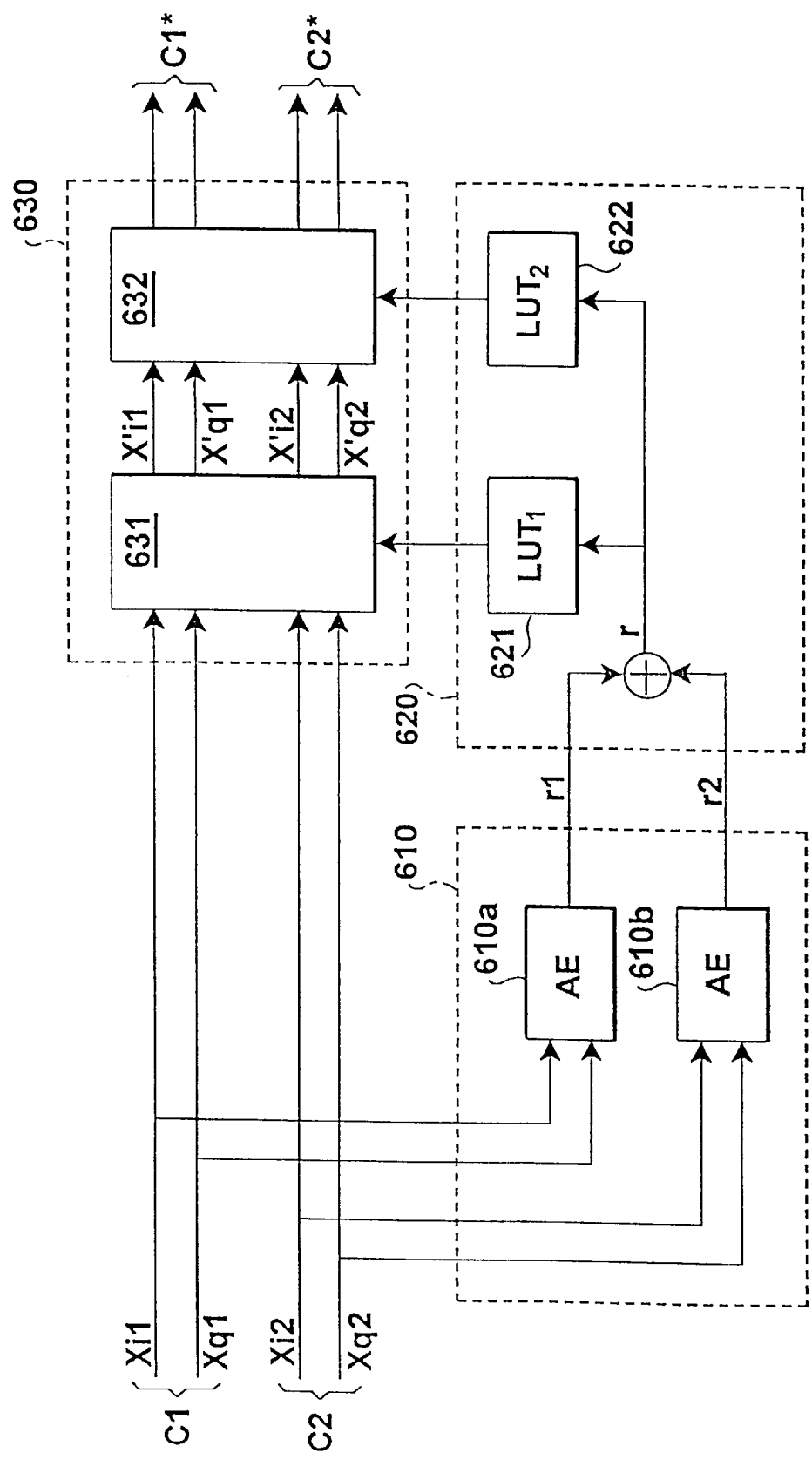
FIG. 6 illustrates an embodiment of the invention, in more detail illustrating functional blocks of a corresponding hardware configuration.

In the following, with respect to FIG. 6, a further embodiment of the invention will be described. FIG. 6 shows a detailed block diagram of functional components illustrating a possible system configuration capable of processing two carrier signals having very high data rates, as present in telecommunication applications, particularly CDMA systems. However, as before, the embodiment of the invention may also be employed in any other system providing very high data rates and requiring the limiting of an amplitude of a composite signal.

As in previous figures, the present embodiment is illustrated with two complex digital carrier signals C1, C2, each of the signals including digitally encoded information transmitted via at least one communication channel. The first carrier signal is constituted by digitally represented complex signal components Xi1, Xq1, the second carrier signal is constituted by digitally represented complex signal components Xi2 and Xq2. An arbitrary number of communication channels $\Phi_v$ may be combined to form each of the complex digital carrier signals C1, C2. Each of the complex carrier signals may be a W-CDMA signal, each with a different carrier frequency. As outlined in previous embodiments, it is intended to amplify both carriers simultaneously in a common high power amplifier prior to transmission, e.g. via the same antenna.

For a highly efficient amplitude limitation of the complex transmission signal, the amplitudes r1, r2 of the complex carrier signals C1, C2 are estimated by the amplitude estimation means 610 comprising two amplitude estimation units 610a, 610b. Subsequently, both amplitudes r1, r2 are supplied to determining means 620 for calculating a maximum amplitude r based on the plurality of estimated amplitudes, e.g., by an add operation of any other operation, and for determining at least one amplitude scaling factor, at least based on the maximum amplitude.

In the present embodiment, a first amplitude scaling factor S1 is determined using a first look-up table 621, and a second amplitude scaling factor S2 is determined using a second look-up table 622. The two scaling factors S1,S2 are supplied to scaling means 630 comprising two scaling units 631, 632 for performing the amplitude limitation by scaling the complex components of each of the plurality of complex digital carrier signals based on the two amplitude scaling factors S1,S2.

It is noted that not necessarily look up tables need to be used for determining the scaling factors, any other data providing means may be used.

The first scaling unit 631, in a coarse clipping operation, may perform the scaling of the digitally represented complex components of each of the plurality of complex digital carrier signals by deleting a number of low significance bits of the digital representations of the components, the number being determined by the first amplitude scaling factor S1. The scaling means 630 may also achieve the deleting of low significance bits by shifting the digital representations of the complex components, e.g., in a register, by a number of register locations determined by the first amplitude scaling factor S1.

The second scaling unit 632, in a fine clipping operation executed after the coarse clipping operation, may multiply the digital representations of each of the complex carrier signal components with the second amplitude scaling factor S2.

At least one of the scaling factors S1, S2 may also be a function of a clipping amplitude of an amplifier and the clipping amplitude may be a function of a pulse shaping filter.

The amplitude limited complex communication signals C1*, C2* may then be combined using combining means (not shown), for generating the transmission signal, e.g., for transmission within a radio frequency band.

In the following, a detailed description of the above-mentioned components of the embodiment of FIG. 6 will be given.

The amplitude estimation means 610 receives, from the combining means, the complex signal components Xi1, Xq1, Xi2,Xq2, representing the two carrier signals C1, C2 and performs the amplitude estimations. A fast and very efficient way to estimate the amplitude of a complex signal, based on the complex components of the signal, may be performed using the CORDIC algorithm, as it is known in the art, e.g. from J. E. Volder, "The CORDIC Trigonometric Computing Technique," IRI Transactions on Electronic Computers, EC-8, 1959, pages 330-334. The CORDIC algorithm allows to performs an iterative estimation of the amplitude of a complex signal. In essence, the complex signal vector is rotated to coincide with the real axis of a complex coordinate diagram. At this point, the magnitude of the real signal component represents the overall amplitude of the signal.

In the present embodiment it is assumed that the amplitudes are estimated using the CORDIC algorithm, even though, in principle, any other estimation algorithm may be used instead.

For a highly efficient and fast amplitude estimation, the two amplitude estimation units 610a, 610b are provided for individually estimating the amplitude of each of the complex signals C1, C2. However, in case a sufficiently fast amplitude estimation unit is available, a single unit could be used for estimating both of the amplitudes of the signals C1, C2.

The amplitude estimation units 610a, 610b perform an amplitude estimation of the complex carrier signals based on respective digitally represented pairs of complex components of the carrier signals C1, C2. In the present example, the amplitude estimation units 610a, 610b iteratively perform an estimation of the amplitudes according to the CORDIC algorithm with at least two iterations. In experiments it can be shown that three iterations according to the CORDIC method already yield highly accurate estimation results. However, in general, two iterations or a larger number of iterations may be employed.

The CORDIC algorithm is designed for implementation directly in hardware and requires only minimal hardware such as shift and add functions. The accuracy of this amplitude estimation is defined by the number of iterations used in the CORDIC. The higher the number of iterations the lower the estimation error. Using four iterations, the maximum error is about 3%.

Additionally, the CORDIC algorithm has an inherent scaling of each estimation result with respect to the correct result by the following amount $$A_{cord} = A_{vector} \cdot \prod_{i=1}^{N_{cord}} \sqrt{1 + 2^{2-2i}}$$

where $A_{cord}$ is the CORDIC result, $N_{cord}$ is the number of iterations, and $A_{vector}$ is the true magnitude of the signal vector. When choosing a value $A_{clip}$ for the coarse and fine clipping, this scaling factor should be taken into account.

For example, the accurate estimated amplitude r1 in case of 3 iterations may also be given by r1 = x3/2.6562+ϵ, where ϵ is the estimation error. However, since the division step need not be computed directly, it may be considered in later steps for limiting the amplitudes according to the present embodiment.

In case three iterations according to the CORDIC method are performed and if $X_0$ represents the magnitude of the real signal component and $Y_0$ represents the magnitude of the imaginary signal component, in a first iteration, the first estimations of the complex signal components $X_1, Y_1$ may be represented as follows:

$$X_1 = X_0 + Y_0 \qquad (7)$$

$$Y_1 = Y_0 - X_0$$

$$s_1 = sgn(Y_1)$$

In a second iteration, the second estimates of the complex signal components $X_2, Y_2$ may be represented as follows:

$$X_2 = X_1 + s_1 \cdot Y_1/2 \qquad (8)$$

$$Y_2 = Y_1 - s_1 \cdot X_1/2$$

$$s_1 = sgn(Y_1)$$

And, in the third iteration, the real signal component $X_3$ may be represented as follows:

$$X_3 = X_2 + s_2 \cdot Y_2/4) \qquad (9)$$

This third estimation of the real component $X_3$ already yields a good estimate of the amplitude of the signal having the complex amplitudes $X_0, Y_0$.

As stated above, estimating the amplitude of the complex signal with sufficient high accuracy may be performed with a small number of steps, avoiding a complex circuit for calculation the square root of the two signal components, as it is needed in an accurate mathematical calculation. For an amplitude estimation, each of the estimation units, e.g., realized as ASICs, merely needs to comprise the necessary hardware to perform the above add, subtraction and shift operations.

After the amplitudes of each of the complex signals have been determined in the above described manner, the estimation means outputs the two estimated amplitudes r1, r2 for further processing to the determining means 620. The determining means determines a maximum amplitude r based on the plurality of estimated amplitudes and determines at least one amplitude scaling factor S1, S2 based on the maximum amplitude r. The scaling factors may further be based on the clipping amplitude of an amplifier. The maximum amplitude may be calculated by summing the amplitudes r1, r2 received from the estimation means in an adding step. Prior to adding, in an additional step, the amplitudes may be individually weighed using weight factors.

The maximum possible amplitude r of the sum of two modulated carriers (with different carrier frequencies) is given by $$r = (xi1^2 + xq1^2)^{1/2} + (xi2^2 + xq2^2)^{1/2} \qquad (10)$$

An ideal amplitude controller provides dividing each complex carrier signal component by this amplitude value r and scaling the result by the desired maximum value $A_{clip}$ in all instances, where the actual amplitude r exceeds the defined limit $A_{clip}$.

However, since the above division operation can not be performed in hardware with an acceptable effort for high sampling frequencies, the determining means is adapted to generate the first and the second scaling factor S1, S2 for scaling the complex signal components in two successive steps. In the present embodiment, the scaling is performed by the scaling means 630 in a coarse clipping operation and fine clipping operation.

The amplitude scaling factors do not need to be computed during operations, they may be previously computed and stored in look-up tables. This significantly reduces the number of required computation steps. The determining means 620 thus may comprise a first look-up table 621 for determining the first amplitude scaling factor S1. This first scaling factor S1 is then output to the scaling means 630 for executing the coarse clipping operation.

In the coarse clipping operation, the signal components or vectors are scaled by a power of 2 in order to perform a coarse scaling. In the coarse clipping operation, the scaling of the digitally represented complex components of the plurality of complex digital carrier signals may be performed by deleting a number of low significance bits of the digital representations of the components, the number being determined by the first amplitude scaling factor S1.

The scaling means may also achieve the deleting of low significance bits by shifting (to the right) the digital representations of the complex-components in a register by a number of register locations determined by the first amplitude scaling factor S1. This scaling may, for example, be implemented in digital hardware by a simple right shift operation.

Preferably, a scaling is performed, only if the maximum amplitude r exceeds a certain threshold, e.g, $A_{clip}$.

Ideally the number of shifts needed, constituting the first scaling factor S1, is calculated by $$S1 = (\text{floor})(\log_2(r/A_{clip})),$$

where S1 stands for the first scaling factor, log2 for the logarithm dualis (base 2 logarithm), r is the maximum amplitude and $A_{clip}$ the clipping amplitude. (floor) instructs to compute the largest integer not larger than the following argument. That is, S1 will be determined as the largest integer smaller than $\log_2(r/A_{clip})$. The coarse clipping may performed by the first scaling unit 631 in a right shift operation or in any other operation to delete a number of bits used for representing the complex carrier signal components.

The $\log_2$ operation may be implemented using a look-up table as shown in Table 1:

TABLE 1

Determining the Number of Right Shifts for Coarse Clipping

| Range | S1 |
|---|---|
| $2^{Qr} - 1 \geq r \geq 2^{S1max} A_{clip}$ | $S1_{max}$ |
| ... | ... |
| $r \geq 8 A_{clip}$ | 3 |
| $r \geq 4 A_{clip}$ | 2 |
| $r \geq 2 A_{clip}$ | 1 |
| $r > A_{clip}$ | 0 |
| $r < A_{clip}$ | 0 no clipping |

The highest number $S1_{max}$ of shifts needed for coarse scaling may be given by the maximum value of the amplitude r, which is represented by the number of $Q_r$ bits, and by the value $A_{clip}$:

$$S1_{max} = (\text{floor})(\log 2 (2^Q/A_{clip})) + 1.$$

It is noted that Table 1 only represents a preferred embodiment of the first look up table for determining the first scaling factor S1, differently structured look up tables are possible, e.g., a different $S1_{max}$ could be used. Further, a different technique for determining the first scaling factor could be employed, without departing from the idea of the invention.

Once the first scaling factor is determined, all components $X_{i1}$, $X_{q1}$, $X_{i2}$, $X_{q2}$, of both carriers C1 and C2 are scaled as follows:

$$X'_{i,q} = X_{i,q} >> S1,$$

where $>>$ stands for a right shift operation, as known in the art. In the present embodiment, this scaling is preferably performed by the first scaling means 631.

After this coarse clipping operation, all vectors with an original maximum amplitude r higher than the allowed amplitude $A_{clip}$ will have an amplitdude in the range $[A_{clip}; 2A_{clip}]$.

After the coarse clipping step the complex signal vectors now have a scaled amplitude between $A_{clip}$ and $2A_{clip}$ and are processed in the fine clipping step by-the second scaling unit 632.

For determining the second scaling factor S2, the determining means 620 may further comprise a second look-up table 622. The second scaling factor S2 constitutes a weight factor for multiplication with the signal components in the fine clipping operation performed after the coarse clipping operation. A suitable second scaling factor may, e.g., be $S2 \in [0,5; 1]$. The accuracy of the fine clipping is determined by the number of bits used for representing the second scaling factor S2. If Q is the accuracy of the second scaling factor S2, defined in bits, the second scaling factor S2 and the amplitude range for which it is valid, are given by the following equations $$A_{clip} \cdot 2^{Q+1}/(2^Q+n) > (r>>S1) \geq A_{clip} \cdot 2^{Q+1}/(2^Q+n+1)$$

$$S2 = \frac{2+n+1}{2^{Q+1}} = \frac{1}{2} + \frac{n+1}{2^{Q+1}},$$

where $n \in [0, 2^Q-2]$ is the number of the assigned interval in the range $a_{clip} < (r>>S1) \leq 2 A_{clip}$.

A second look up table 622 may be defined using the above equation. In Table 2 an example is given for the case Q=3.

TABLE 2

Defining the Weighting Factor for Fine Clipping with 3 bit Accuracy

| Range | second scaling factor S2 | second scaling factor S2 binary repres. (decimal repres.) |
|---|---|---|
| (r >> S1) > 16/9 · $A_{clip}$ | 9/16 | 0.1001 (0.5625) |
| (r >> S1) > 16/10 · $A_{clip}$ | 10/16 | 0.1010 (0.6250) |
| (r >> S1) > 16/11 · $A_{clip}$ | 11/16 | 0.1011 (0.6875) |
| (r >> S1) > 16/12 · $A_{clip}$ | 12/16 | 0.1100 (0.75) |
| (r >> S1) > 16/13 · $A_{clip}$ | 13/16 | 0.1101 (0.8125) |
| (r >> S1) > 16/14 · $A_{clip}$ | 14/16 | 0.1110 (0.875) |
| (r >> S1) > 16/15 · $A_{clip}$ | 15/16 | 0.1111 (0.9375) |
| (r >> S1) $\leq a_{clip}$ | 1 | 1.0000 (1.0) |

It is noted that Table 2 only represents a preferred embodiment of the second look up table for determining the second scaling factor S2, differently structured look up tables are possible, e.g., a larger number of entries for the look up table could be employed for determining the second scaling factor S2.

The functional elements shown and described with respect to FIG. 6 may be implemented in hardware with an acceptable effort, e.g., using ASICs. The computation may be executed with sufficiently speed in order to accommodate very high data rates, as they are encountered in CDMA systems.

Even though the present embodiment is illustrated with two carrier signals, in general an arbitrary number of carrier signals may be processed instead.

In order to further reduce the computation effort for determining the amplitudes of the complex carrier signals and for determining the scaling factors, several shift operations, similar to the one performed by the first scaling unit 631, may be performed for reducing the number of bits needed for a representation of intermediate results during amplitude limitation.

Figure 7:
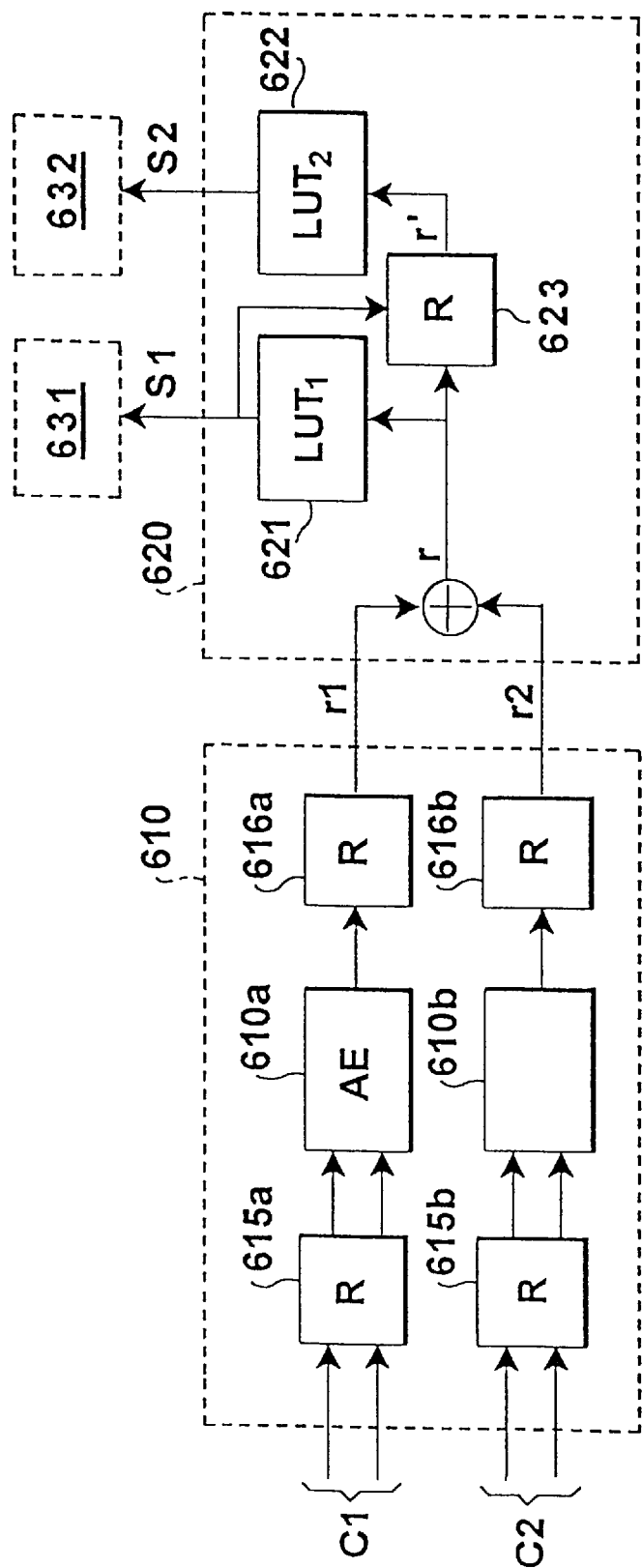
FIG. 7 illustrates a further embodiment of invention, showing further detailed functional blocks of a hardware configuration.

In FIG. 7, a further embodiment of the invention is shown, similar to the one described with respect to FIG. 6, additionally comprising devices allowing a further reduction of the computational effort.

The full resolutions of the digital representations of the complex components of the carrier signals are not needed for estimating the amplitudes of the carrier signals in the CORDIC estimation operation performed by the estimation means 610. Further, the signs of the complex signal components are not needed for the CORDIC estimation.

Therefore, prior to estimating the amplitudes, the absolute values of the complex signal components of the carrier signals may be determined by first reducing means 615a, 615b. And further, in a shift operation, similar to the one outlined with respect to the coarse scaling, the first reducing means 615a, 615b may reduce the number of bits needed for a representation of the complex signal components.

Similarly, the full resolution of the estimated amplitude of a carrier signal is not needed for computing the at least one scaling factors and therefore, second reducing means 616a, 616b, in a further shift operation, again similar to the coarse scaling shift operation, reduce the number of bits needed for representing the amplitude of a carrier signal.

Thus, the estimation of the amplitudes of the two channels C1 and C2 is started with a step which eliminates the sign of the components Xi1, Xq1, Xi2 and Xq2 and which may additionally reduce the magnitude of the complex signal components, e.g., be a shift operation. This allows to reduce the complexity of the CORDIC algorithm.

Further, in addition to the components outlined with respect to FIG. 6, the determining means of FIG. 7 additionally includes a third reducing means 623 for reducing the number of bits used for a digital representation of the maximum amplitude prior to determining the second amplitude scaling factor S2. This may be achieved by right shifting the maximum amplitude r by the first scaling factor S1 determined in the first look-up operation.

Thus, the estimated amplitude value r will be scaled r'

$r'=r>>S1$, and thus, the second look up table 622 may be written as shown in Table 3.

TABLE 3

Defining the Weighting Factor for
Fine Clipping with 3 bit Accuracy

| Range | second scaling factor S2 | second scaling factor S2 binary repres. (decimal repres.) |
|---|---|---|
| r' > 16/9 · $A_{clip}$ | 9/16 | 0.1001 (0.5625) |
| r' > 16/10 · $A_{clip}$ | 10/16 | 0.1010 (0.6250) |
| r' > 16/11 · $A_{clip}$ | 11/16 | 0.1011 (0.6875) |
| r' > 16/12 · $A_{clip}$ | 12/16 | 0.1100 (0.75) |
| r' > 16/13 · $A_{clip}$ | 13/16 | 0.1101 (0.8125) |
| r' > 16/14 · $A_{clip}$ | 14/16 | 0.1110 (0.875) |
| r' > 16/15 · $A_{clip}$ | 15/16 | 0.1111 (0.9375) |
| r' ≤ $a_{clip}$ | 1 | 1.0000 (1.0) |

Although preferred embodiments of the system, apparatus and method of the present invention have been illustrated in the accompanying Drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. An apparatus limiting an amplitude of a transmission signal, comprising:

estimation means for estimating the amplitudes of each of a plurality of complex digital carrier signals based on their complex signal components, each of the signals including digitally encoded information transmitted via at least one communication channel;

determining means for calculating a maximum amplitude based on the plurality of estimated amplitudes and for determining at least one amplitude scaling factor based on the maximum amplitude;

scaling means for scaling the complex components of each of the plurality of complex digital carrier signals based on the at least one amplitude scaling factor; and combining means for combining the amplitude limited complex carrier signals to form the transmission signal.

2. The apparatus according to claim 1, wherein the estimation means iteratively performs the estimation of the amplitudes according to the CORDIC algorithm with at least two iterations.

3. The apparatus according to claim 1, including:

first reducing means for reducing the number of bits used for a representation of the complex carrier signal components and for determining the absolute value of the complex components prior to providing the complex signal components to the estimation means; and second reducing means for reducing the number of bits used for a digital representation of the estimated amplitudes.

4. The apparatus according to claim 1, wherein the at least one amplitude scaling factor is also a function of a clipping amplitude of an amplifier and the clipping amplitude is a function of a pulse shaping filter.

5. The apparatus according to claim 4, wherein the at least one amplitude scaling factor is determined as the largest integer smaller than the logarithm dualis of the maximum amplitude divided by the clipping amplitude.

6. The apparatus according to claim 1, including:

filter means for pulse shaping each of the plurality of amplitude limited complex digital carrier signals; and means for combining the plurality of amplitude limited complex digital carrier signals, for generating a code division multiple access (CDMA) signal.

7. An apparatus limiting an amplitude of a transmission signal, comprising:

estimation means for estimating the amplitudes of each of a plurality of complex digital carrier signals based on their complex signal components, each of the signals including digitally encoded information transmitted via at least one communication channel;

determining means for calculating a maximum amplitude based on the plurality of estimated amplitudes, including a first look up table for determining a first amplitude scaling factor based on the maximum amplitude and a second look up table for determining a second scaling factor;

scaling means for scaling, in a coarse clipping operation, the digitally represented complex components of each of the plurality of complex digital carrier signals by deleting a number of low significance bits of the digital representations of the components, the number being determined by the first amplitude scaling factor, and for scaling, in a fine clipping operation executed after the coarse clipping operation, by multiplying the digital representations of each of the complex components with the second amplitude scaling factor; and combining means for combining the amplitude limited complex carrier signals to form the transmission signal.

8. The apparatus according to claim 7, wherein the estimation means iteratively performs the estimation of the amplitudes according to the CORDIC algorithm with at least two iterations.

9. The apparatus according to claim 7, including:

first reducing means for reducing the number of bits used for a representation of the complex carrier signal components and for determining the absolute value of the complex components prior to providing the complex signal components to the estimation means; and second reducing means for reducing the number of bits used for a digital representation of the estimated amplitudes.

10. The apparatus according to claim 7, wherein the at least one amplitude scaling factor is also a function of a clipping amplitude of an amplifier and the clipping amplitude is a function of a pulse shaping filter.

11. The apparatus according to claim 10, wherein the at least one amplitude scaling factor is determined as the largest integer smaller than the logarithm dualis of the maximum amplitude divided by the clipping amplitude.

12. The apparatus according to claim 7, wherein the scaling means achieves the deleting of low significance bits by shifting the digital representations of the complex components in a register by a number of register locations determined by the first amplitude scaling factor.

13. The apparatus according to claim 7, including:

third reducing means for reducing the number of bits used for a digital representation of the maximum amplitude prior to determining the second amplitude scaling factor.

14. The apparatus according to claim 7, including:

filter means for pulse shaping each of the plurality of amplitude limited complex digital carrier signals; and means for combining the plurality of amplitude limited complex digital carrier signals, for generating a code division multiple access (CDMA) signal.

15. A method for limiting an amplitude of a transmission signal, comprising the steps of:

estimating the amplitudes of each of a plurality of complex digital carrier signals based on their complex signal components, each of the signals comprising digitally encoded information transmitted via at least one communication channel;

calculating a maximum amplitude based on the plurality of estimated amplitudes;

determining at least one amplitude scaling factor based on the maximum amplitude;

scaling the complex components of each of the plurality of complex digital carrier signals based on the at least one amplitude scaling factor; and combining the amplitude limited complex carrier signals to form the transmission signal.

16. The method according to claim 15, including the step of iteratively performing the estimation of the amplitudes according to the CORDIC algorithm with at least two iterations.

17. The method according to claim 15, including the steps of:

determining the absolute value of the complex components prior to processing the complex signal components for the amplitude estimation;

reducing the number of bits used for a representation of the complex carrier signal components; and reducing the number of bits used for a digital representation of the estimated amplitudes.

18. The method according to claim 15, wherein the at least one amplitude scaling factor is also a function of a clipping amplitude of an amplifier and the clipping amplitude is a function of a pulse shaping filter.

19. The method according to claim 18, wherein the at least one amplitude scaling factor is determined as the largest integer smaller than the logarithm dualis of the maximum amplitude divided by the clipping amplitude.

20. The method according to claim 15, including the steps of:

pulse shaping each of the plurality of amplitude limited complex digital carrier signals; and combining the plurality of amplitude limited complex digital carrier signals, to form a code division multiple access (CDMA) signal.

21. A method for limiting an amplitude of a transmission signal, comprising the steps of:

estimating the amplitudes of each of a plurality of complex digital carrier signals based on their complex signal components, each of the signals comprising digitally encoded information transmitted via at least one communication channel;

calculating a maximum amplitude based on the plurality of estimated amplitudes;

determining a first amplitude scaling factor based on the maximum amplitude using a first look up table and determining a second amplitude scaling factor using a second look up table;

scaling, in a coarse clipping operation, the digitally represented complex components of each of the plurality of complex digital carrier signals by deleting a number of low significance bits of the digital representations of the components, the number being determined by the first amplitude scaling factor, and scaling, in a fine clipping step executed after the coarse clipping step, by multiplying the digital representations of each of the complex components with the second amplitude scaling factor; and combining the amplitude limited complex carrier signals to form the transmission signal.

22. The method according to claim 21, including the step of iteratively performing the estimation of the amplitudes according to the CORDIC algorithm with at least two iterations.

23. The method according to claim 21, including the steps of:

determining the absolute value of the complex components prior to processing the complex signal components for the amplitude estimation;

reducing the number of bits used for a representation of the complex carrier signal components; and reducing the number of bits used for a digital representation of the estimated amplitudes.

24. The method according to claim 21, wherein the at least one amplitude scaling factor is also a function of a clipping amplitude of an amplifier and the clipping amplitude is a function of a pulse shaping filter.

25. The method according to claim 24, wherein the at least one amplitude scaling factor is determined as the largest integer smaller than the logarithm dualis of the maximum amplitude divided by the clipping amplitude.

26. The method according to claim 21, wherein the scaling means achieves the deleting of low significance bits by shifting the digital representations of the complex components in a register by a number of register locations determined by the first amplitude scaling factor.

27. The method according to claim 21, including the step of reducing the number of bits used for a digital representation of the maximum amplitude prior to determining the second amplitude scaling factor.

28. The method according to claim 21, including the steps of:
- pulse shaping each of the plurality of amplitude limited complex digital carrier signals; and
- combining the plurality of amplitude limited complex digital carrier signals, to form a code division multiple access (CDMA) signal.

* * * * *